(No Model.)
J. SWEGLES.
ANTIFRICTION BEARING.
No. 506,953. Patented Oct. 17, 1893.
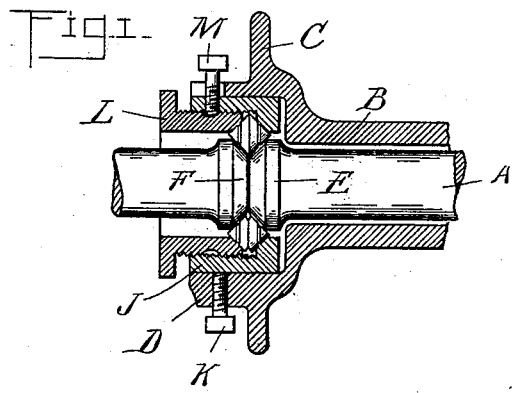
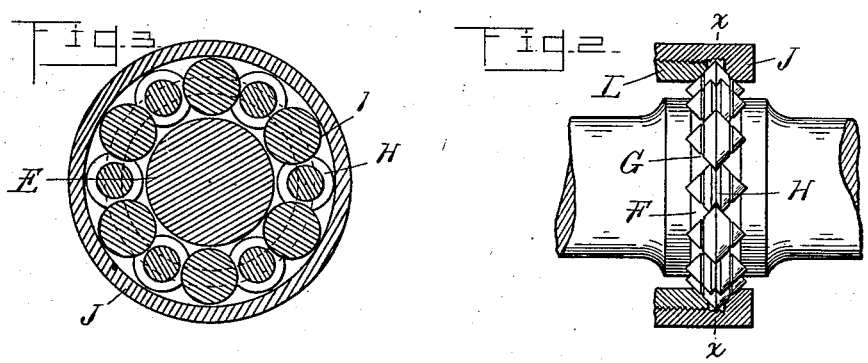
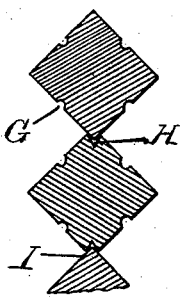
Witnesses,
Otto F. Barthel,
N. L. Lindop.
Inventor,
John Swegles,
By Thos. S. Sprague & Son
Atty's.

UNITED STATES PATENT OFFICE.

JOHN SWEGLES, OF WAYNE, MICHIGAN, ASSIGNOR OF ONE-HALF TO JAMES L. EATON, OF SAME PLACE.

ANTIFRICTION-BEARING.

SPECIFICATION forming part of Letters Patent No. 506,953, dated October 17, 1893.

Application filed December 27, 1892. Serial No. 456,381. (No model.)

*To all whom it may concern:*

Be it known that I, JOHN SWEGLES, a citizen of the United States, residing at Wayne, in the county of Wayne and State of Michigan, have invented certain new and useful Improvements in Antifriction-Bearings, of which the following is a specification, reference being had therein to the accompanying drawings.

This invention consists in the peculiar construction of the rollers and in the bearing therefor upon the bicycle or other vehicle axle, all as more fully hereinafter described and shown in the drawings, in which—

Figure 1 is a vertical, central, longitudinal section through a bearing embodying my invention. Fig. 2 is a sectional plan of Fig. 1. Fig. 3 is a cross-section on line $x$—$x$ Fig. 1. Fig. 4 is an enlarged section through two of the rollers designed to show the details of the construction.

A is the axle.

B is the hub of the wheel having the end flange C and the collar D extending from the outer face of said flanges and separated a proper distance from the axle being concentric therewith.

The axle is provided with two collars E at each end and between these collars is formed a V-shaped way or groove F.

The rollers of my bearings are formed in the shape of two cones joined together at the base, the whole forming a roller substantially rectangular in cross-section, as shown in Fig. 4. These double cone rollers as I shall call them are provided on each side of the center with circumferential grooves G which serve as receptacles for oil, or for dust in case oil is not employed to prevent undue wearing of the rollers. The rollers are arranged to lie in the V-shaped groove F. I form in every alternate roller a circumferential V-shaped groove H, with which the apex I of the adjoining roller engages, as particularly shown in Figs. 2 and 4, thereby preventing the possibility of the rollers assuming an angular position to each other and thus binding in their travel, and also reducing the friction to a minimum. These rollers may be held in position in the axle by any suitable bearings on the hub, that which I have shown consisting of the flanged ring J having a bearing for the inner face of the roller and held in position by the set screw K, passing through the collar D, and the bearing ring L, having a screw-threaded engagement with the interior of the ring J, and bearing against the inclined outer face of the rollers being locked in its adjusted position by means of a set screw M. This set-screw M passes through a slot in the collar D and engages in a screw-threaded bearing in the collar J.

What I claim as my invention is—

1. In a roller bearing, the combination with the axle having a substantially V-shaped groove formed therein, of double cone rollers, resting in said groove every alternate roller being provided with a circumferential V shaped groove at the base of the cones in which the edge of the adjoining roller engages, substantially as described.

2. In a roller bearing, the combination with an axle, having a substantially V shaped groove formed therein, of double cone rollers resting in said groove every alternate roller being provided with a circumferential groove with which the edge of the adjoining roller engages and each roller having circumferential grooves in their opposite inclined sides, substantially as described.

In testimony whereof I affix my signature in presence of two witnesses.

JOHN SWEGLES.

Witnesses:
JAS. L. EATON,
ADOLPH BARTHEL.